Jan. 10, 1928.

C. T. SIEBS 1,655,847

MAGNETIC TEMPERATURE REGULATOR

Original Filed Jan. 2, 1926

Inventor
Claude T. Siebs
by H. A. Jattum
Att'y.

Patented Jan. 10, 1928.

1,655,847

UNITED STATES PATENT OFFICE.

CLAUDE THEODORE SIEBS, OF RIVERSIDE, ILLINOIS, ASSIGNOR TO WESTERN ELECTRIC COMPANY, INCORPORATED, OF NEW YORK, N. Y., A CORPORATION OF NEW YORK.

MAGNETIC TEMPERATURE REGULATOR.

Application filed January 2, 1926, Serial No. 79,048. Renewed September 16, 1927.

This invention relates to magnetic temperature regulators, and more particularly to devices of the above character adapted to respond to changes in temperature for controlling an electrical circuit which controls the temperature and vice versa.

The principal object of the invention is to provide a temperature controlled device responsive to exceedingly small variations in temperature for maintaining a body being heated at a substantially constant temperature.

In accordance with one embodiment, the invention contemplates a magnetic control means operatively responsive to temperature changes in which an alloy metal is utilized as a part of the magnetic circuit which is affected by temperature variations to cause operative response of the magnetic control means for controlling or regulating the temperature and maintain it within limits closer than the critical points of the alloy or the temperature change necessary in the metal to cause it to effect the regulation.

As a more specific use of the regulator, it is adapted to be associated with an oven or other heating apparatus which is to be kept at a substantially constant temperature and in which the alloy metal part of the magnetic circuit is heated by the oven and also by a heating coil included in the electrical circuit controlled thereby. That is, the magnetic device is heated from the oven which is being controlled, and in addition heating or temperature boosting coils are provided for raising the temperature to a critical point at which it loses its normal magnetic permeability, at which point the circuit for the boosting coil is interrupted so that the temperature responsive portion of the magnetic circuit may cool to the other critical point at which the alloy regains its normal magnetic permeability without waiting for the oven to cool appreciably, and thus maintain it within a narrow range of temperature variation. The alloy metal part is of small mass so that it responds readily to changes in temperature. A metal of the nickel-iron series is preferably employed as the part of the magnetic circuit affected by the temperature variations.

For a better understanding of the present invention reference is to be had to the accompanying drawing, in which Fig. 1 shows one form of the invention adapted for regulating the temperature of an oven and in which the temperature responsive portion of the magnetic circuit is included in the magnet with heating coils wound thereon;

Referring first in general to some features of the invention, although a nickel-iron alloy is preferably employed, the invention is not limited to the use of this particular temperature responsive element. The particular alloy employed depends upon the temperature desired to be maintained, for instance, in case the desired temperature is 750° F. Preferably a 45–55% nickel-iron alloy is used which forms a metal part of the magnetic field and is responsive to temperature changes so that it loses its normal magnetic permeability at a predetermined critical temperature. This alloy in addition to being heated from the oven, the temperature of which is being controlled, has its temperature raised by heating or boosting coils wound thereon. Thus assuming, if the oven is to be maintained at a temperature of 750° F. and the alloy loses its normal magnetic permeability at 790° F., boosting coils are provided which increase the temperature by 40° so as to raise it to 790° F. which is its critical temperature. At this point it loses its normal magnetic permeability, whereupon the heating circuit is interrupted and the alloy portion of the magnetic field, owing to its small mass, therefore quickly cools to its other critical temperature at which it regains its normal magnetic permeability which is 750° F. or the oven temperature, before the oven has had time to appreciably alter its temperature. In other words a control giving a variation of temperature change of but a few degrees in the oven is secured although a temperature change of 40° F. is required in the alloy.

Figure 1:
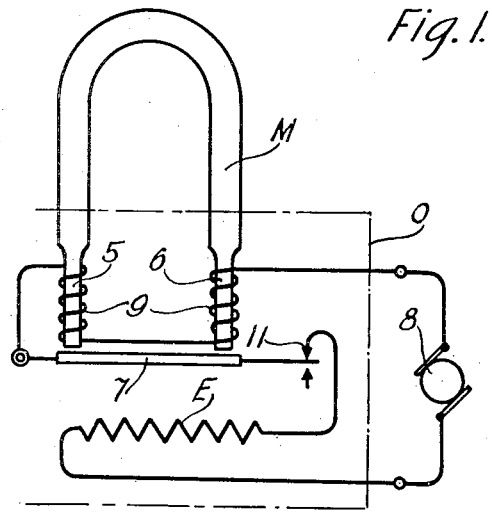
Figure 2:
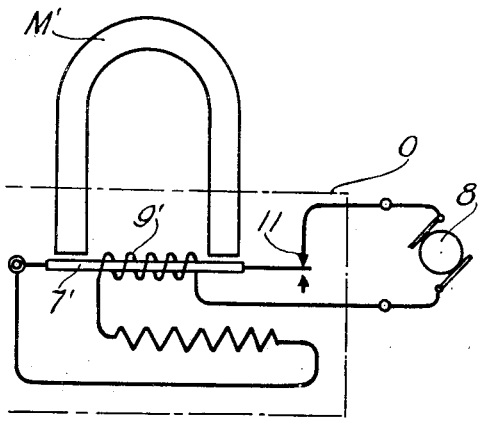
Fig. 2 shows another form of the invention in which the temperature responsive alloy is in the armature with the heating coil wound thereon.

Referring to the forms of the invention as shown in Figs. 1 and 2, in each case the regulator is placed inside of the oven indicated by the line O and in which the temperature is to be controlled. A suitable magnet M which may be a permanent magnet in case the temperatures to which it is subjected are sufficiently low so that its permanence is affected, and a cooperating armature 7 is provided, although it will be apparent that an electro-magnet may also be used. In each case there is provided in the magnetic circuit a part of an alloy which is affected by temperature changes to effect attraction and retraction of the armature, the form of Fig. 1 having said alloy forming magnet or pole extensions 5—6 included in the magnetic circuit for attracting the armature 7. An oven heating element E is provided which is fed by current from a suitable source as 8 and a heating coil including windings 9 is provided for the temperature affected part of the magnetic circuit for varying the temperature thereof to cause the attraction and retraction of the armature, thereby closing and opening contacts 11 to close and open the circuit of the oven heating element E.

In the form of the invention shown in Fig. 2 the alloy part of the magnetic circuit is in the armature 7' and therefore the heating coil 9' surrounds the armature so as to raise the temperature thereof to the point at which it loses its normal magnetic permeability to cause its release, whereupon it will cool to the temperature at which it regains its normal magnetic permeability so as to be again attracted by the magnet M'.

As to the heating coils 9—9' of Figs. 1 and 2, these may be wound either magnetically or non-inductively, as they may be used either for simply heating the alloy or for heating and magnetizing it to increase the magnetic circuit.

Referring now to the operation of the regulator of Fig. 1 and assuming, for example, that a constant oven temperature of 750° F. is desired, 45-55% nickel-iron tips or pole extensions 5—6 are used which will lose their normal magnetic permeability at about 790° F. and regain their normal magnetic permeability at 750° F. As the oven temperature is to be maintained at 750° F. auxiliary or alloy heating coils are provided which will add 40° F. to the alloy temperature above the oven temperature. In other words, the heating coils act as booster coils to raise the temperature of the alloy sufficiently above the oven temperature to cause it to lose its normal magnetic permeability. In order to maintain the oven temperature within close limits, that is, within a small variation, the alloy is preferably arranged as a part of the magnetic circuit so that it will be rapidly heated from 750° F. to 790° F. by the flow of the heating current when on, and in turn will rapidly cool to the oven temperature by means of conduction and radiation when the heating current therethrough is broken.

Assuming that the current is connected to the device of Fig. 1 by closing the armature and contacts 11, said armature is maintained closed until the oven O has reached a temperature of 750° F. and the tips 5—6 a temperature of 790° F. by reason of the current through the heating coils 9. At this point the tips lose their normal magnetic permeability so that the armature 7 is released, opening the circuit for the heating element E and heating coils 9. The alloy tips 5—6 will cool more rapidly than the oven and will reach the temperature of 750° F. before the oven has had time to cool appreciably below its desired temperature of 750° F. Therefore, at this point the tips 5—6 again regain their normal magnetic permeability to attract the armature 7 and again close the heating circuit through element E and heating coils 9 so that the same cycle of operations again takes place and the oven maintained at a substantially constant and regulated temperature of 750° F.

From a consideration of the operation of Fig. 1 the operation of Fig. 2 will be readily understood, the only difference being that in Fig. 2 the heating coil 9' is on the armature which includes the alloy part of the magnetic circuit.

With the construction of Figs. 1 and 2 the oven is maintained at a substantially constant temperature so that if any other temperature is desired the coils 9 may be changed, a different alloy used or the amount of current passing through the coils may be altered.

Figure 3:
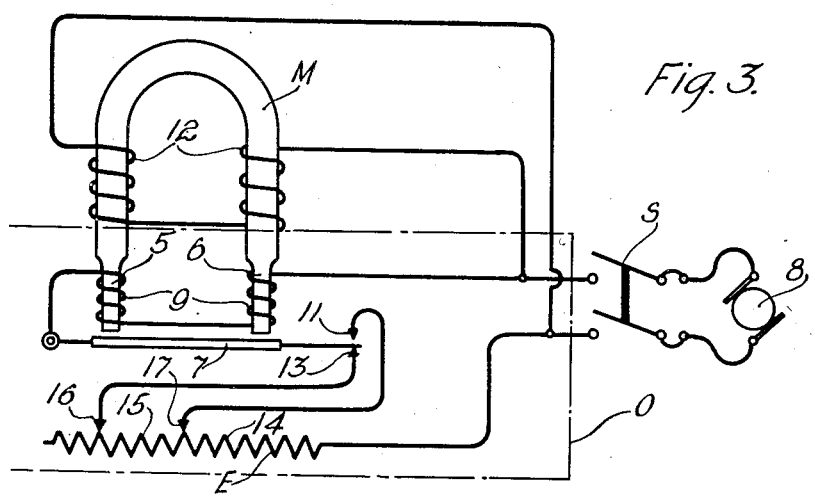
Fig. 3 shows a method of readily varying the controlled temperature range of the oven without alteration of the alloy and in which the alloy forms part of the magnet with the heating coils wound thereon.
Figure 4:
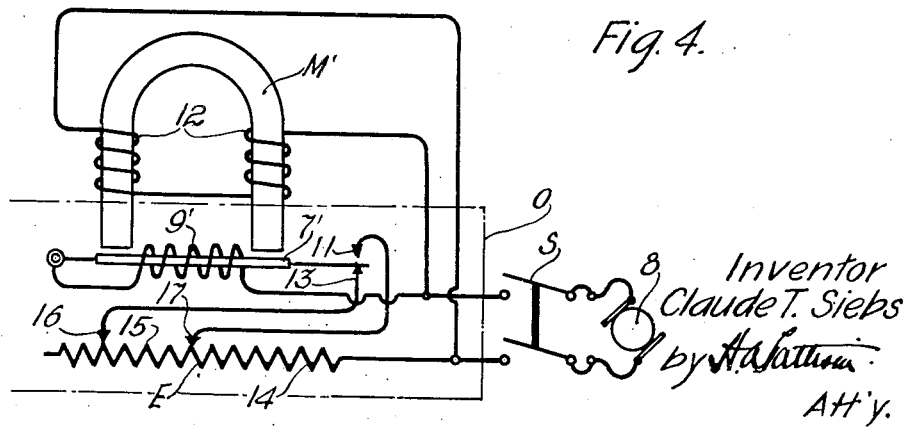
Fig. 4 is an arrangement similar to Fig. 3 but with the alloy in the armature and the heating coil wound thereon.

In order to permit a variation of the desired maintained temperature without change of the heating coils or alloy, an adjustable arrangement as shown in Figs. 3 and 4 is provided whereby the desired constant temperature may be increased or decreased within the ranges of the adjustment.

In the arrangement of Fig. 3 the magnet M is an electromagnet with the windings 12 thereon and the heating windings 9 on the pole extensions 5—6 which may be of a nickel-iron alloy as in Fig. 1. The armature 7, in addition to the alternate contact 11, has a normal or back contact 13. The oven heating element E is adjustable, with the heating sections 14—15 arranged so that section 15 may be varied by the movable contact 16.

In the arrangement of Fig. 3 the desired constant temperature of the oven O may be varied by adjustment of sliding contact 16. That is, by moving this contact to the right or closer to connection 17, a lower oven temperature is secured and if contact 16 is moved to the left or away from connection 17, a higher oven temperature is secured.

So it is the variation of current through the alloy heating coils 9 during the release of the armature that varies the constant temperature of the oven. With contact 16 moved toward the left or away from connection 17 there is less current through the heating coil with the armature released, and therefore the tips 5—6 cool quicker and this will keep the heavy heating current connected for a longer period and keep the temperature of the oven higher. If contact 16 is moved toward the right and closer to connection 17, there will be more current through the heating coil when the armature is released and therefore the tips do not cool so quickly and this will keep the heavy heating current connected for shorter periods and thus keep the temperature of the oven lower.

In the operation of the controller of Fig. 3 and with switch S closed, magnet M attracts the armature 7 to close a circuit through the contact 11 and the heating element 14 in series with the alloy heating coils 9. As soon as the tips 5—6 have been brought up to the temperature at which they lose their normal magnetic permeability, the armature 7 is released and the added resistance 15 is brought in circuit so that the heating current through coils 9 is reduced and when the tips 5—6 cool to their lower critical temperature armature 7 is again attracted to disconnect the portion 15 and connect the main heating element 14 only in circuit. With the apparatus adjusted as shown a certain constant temperature of the oven is maintained, that is, within a close range.

Assuming now that a higher constant oven temperature is desired, contact 16 is moved to the left or away from connection 17 so that the current through element heating coils 9 is less during the non-heating period of the oven and this will make the tips 5—6 cool quicker than before. This means that the heavy heating current of element 14 is on for longer relative periods, that is, relative to the off period with armature 7 retracted, and therefore the constant or controlled temperature of the oven is higher than with contact 16 as shown in Fig. 3.

Assuming that a lower temperature of the oven is desired, then contact 16 is moved closer to connection 17 so that there will be more current through the alloy heating coils 9 with the armature released, that is, during the oven non-heating period, and therefore the tips will not cool so quickly and this will keep the heavy heating coil 14 on for a shorter relative period, that is, relative to the time that element 15 is in circuit, and therefore the controlled temperature of the oven is lower.

So it is the variation of the current through the alloy heating coils 9 during the release of the armature, or its low or non-oven heating period, that determines the controlled temperature of the oven.

In Fig. 4 I have shown an adjustable arrangement similar to Fig. 3 but using the alloy in the armature 7' as in Fig. 2 and with the heating coil 9' wound thereon.

What is claimed is:

1. In a magnetic temperature regulator, a magnetic circuit including a magnet and co-operating armature in which the magnetic permeability of a metal part of the magnetic circuit is responsive to temperature changes to cause co-operation of the magnet and armature, a temperature producing heating element, a heating coil for said metal part of the magnetic circuit, and a control circuit for said heating element and heating coil controlled by co-operation of said magnet and armature for causing temperature changes to effect said co-operation for regulating the produced temperature.

2. In a magnetic temperature regulator, a magnetic circuit including a magnet and co-operating armature in which the magnetic permeability of a metal part of the magnetic circuit is responsive to temperature changes to cause co-operation of the magnet and armature, a temperature producing heating element controlled by co-operation of the magnet and armature for regulating the produced temperature, and a heating coil for said metal part of the magnetic circuit controlled by co-operation of said magnet and armature.

3. In a magnetic temperature regulator, a magnetic circuit including a magnet and co-operating armature in which the magnetic permeability of a metal part of the magnetic circuit is responsive to temperature changes to cause co-operation of the magnet and armature, a temperature producing heating element, a heating coil for said metal part of the magnetic circuit, and a control circuit for the heating element and heating coil controlled by said co-operation of the magnet and armature for maintaining the produced temperature within predetermined limits.

4. In a magnetic temperature regulator, a magnetic circuit including a magnet and co-operating armature and in which the magnetic permeability of a metal part of the magnetic circuit is responsive to temperature changes to cause co-operation of the magnet and armature, a temperature producing heating element, a heating coil for said metal part of the magnetic circuit, a control circuit for the heating element and heating coil controlled by said co-operation of the magnet and armature for maintaining the produced temperature within predetermined limits, and means for varying the current in the circuit for the heating coil to change the heating effect thereof on said metal part to vary the produced temperature to other desired predetermined limits.

5. In a magnetic temperature regulator, a magnetic circuit including a magnet and co-operating armature and in which the magnetic permeability of a metal part of the magnetic circuit is responsive to temperature changes to cause co-operation of the magnet and armature, a temperature producing heating element, a heating coil for said metal part of the magnetic circuit, a control circuit for the heating element and heating coil controlled by said co-operation of the magnet and armature for maintaining the produced temperature within predetermined limits, and means for varying the current in the circuit for the heating coil to change the heating effect thereof on said metal part to increase the predetermined upper limit of the produced temperature to a higher degree.

6. In a magnetic temperature regulator, a magnetic circuit including a magnet and co-operating armature and in which the magnetic permeability of a metal part of the magnetic circuit is affected by temperature changes to cause co-operation of the magnet and armature, a temperature producing heating element, a heating coil for said metal part of the magnetic circuit, a control circuit for the heating element and heating coil controlled by said co-operation of the magnet and armature for maintaining the produced temperature within predetermined limits, and means for varying the current in the circuit for the heating coil to change the heating effect thereof on said metal part to decrease the predetermined upper limit of the produced temperature to a lower degree.

7. In a magnetic temperature regulator, a magnetic circuit including a magnet and co-operating armature and in which the magnetic permeability of a metal part of the magnetic circuit is affected by temperature changes to cause co-operation of the magnet and armature, a temperature producing heating element, a heating coil for said metal part of the magnetic circuit, a control circuit for the heating element and heating coil controlled by said co-operation of the magnet and armature for maintaining the produced temperature within predetermined limits, and means for varying the current in the circuit for the heating element and heating coil to change the heating effect of the heating element and change the heating effect of the heating coil on said metal part to increase or decrease the produced temperature to other desired predetermined limits.

8. In a magnetic temperature regulator, a magnetic circuit including a magnet and co-operating armature and in which the magnetic permeability of a metal part of the magnetic circuit is affected by temperature changes to effect attraction and retraction of the armature, a temperature producing heating element, a heating coil for said metal part of the magnetic circuit, a control circuit for the heating element and heating coil controlled by attraction and retraction of said armature for correspondingly varying the heating effect of the heating coil for maintaining the produced heat substantially constant at a desired temperature, and means for supplying a different temperature by changing the current that flows through the heating coil during the retraction of the armature.

9. In a magnetic temperature regulator for a heating apparatus, a magnetic circuit including a magnet and armature and in which the magnetic permeability of a metal part of the magnetic field is affected by temperature changes to effect attraction and retraction of the armature, a temperature producing heating element, a heating coil for said metal part of the magnetic circuit, a circuit for the heating element controlled by operations of the armature, a circuit for the heating coil varied by operations of the armature to provide heating and cooling periods for said metal part of the magnetic field to cause operations of the armature for maintaining a substantially constant temperature in the heating apparatus, and means for varying the cooling period of said metal part for changing the maintained temperature.

10. In a magnetic temperature regulator for a heating apparatus, a magnetic circuit including a magnet and armature and in which the magnetic permeability of a metal part of the magnetic circuit is susceptible to temperature changes to effect attraction and retraction of the armature, a temperature producing heating element, a heating coil for said metal part of the magnetic circuit, a circuit for the heating element controlled by operations of the armature, a circuit for the heating coil varied by operations of the armature to provide heating and cooling periods for said metal part of the magnetic circuit to cause operations of the armature for maintaining a substantially constant temperature in the heating apparatus, and means for increasing the cooling period of said metal part to increase the maintained temperature.

11. In a magnetic temperature regulator for a heating apparatus, a magnetic circuit including a magnet and armature and in which the magnetic permeability of a metal part of the magnetic circuit is susceptible to temperature changes to effect attraction and retraction of the armature, a temperature producing heating element, a heating coil for said metal part of the magnetic circuit, a circuit for the heating element controlled by operations of the armature, a circuit for the heating coil varied by operations of the armature to provide heating and cooling periods for said metal part of the magnetic circuit to cause operations of the armature for maintaining a substantially constant temperature in the heating apparatus, and means for decreasing the cooling period of said metal part to decrease the maintained temperature.

12. In a magnetic temperature regulator for a heating apparatus, a magnetic circuit including a magnet and co-operating armature and in which the magnetic permeability of a metal part of the magnetic circuit is exposed to the heat of the heating apparatus and susceptible to temperature changes of substantially separated lower and upper temperature limits to cause said metal part to possess and lose its normal magnetic permeability to effect attraction and retraction of the armature, a heating element, a heating coil for said metal part of the magnetic field for raising the temperature thereof above that of the heating apparatus, and means for controlling said element and coil for maintaining the temperature in the heating apparatus within a substantially closer range than the temperature range necessary for causing said metal part to lose and regain its normal magnetic permeability.

13. In a magnetic temperature regulator for a heating apparatus, a magnetic circuit including a magnet and co-operating armature and in which a metal part of the magnetic field is exposed to the heat of the heating apparatus and has widely separated critical points at which it attains and loses its normal magnetic permeability to control the armature, a heating element for heating the apparatus, means for raising the temperature of the metal part above that of the heating apparatus, and means for controlling said element, and said means for maintaining the temperature of the heating apparatus within a range substantially closer than the range between the critical points of the metal part.

In witness whereof, I hereunto subscribe my name this 19th day of December, A. D. 1925.

CLAUDE THEODORE SIEBS.